Dec. 22, 1931.　　　　　C. J. ERNST　　　　　1,837,957
AUTOMATIC FEED WHEEL BLOWER
Filed March 9, 1929　　2 Sheets-Sheet 1
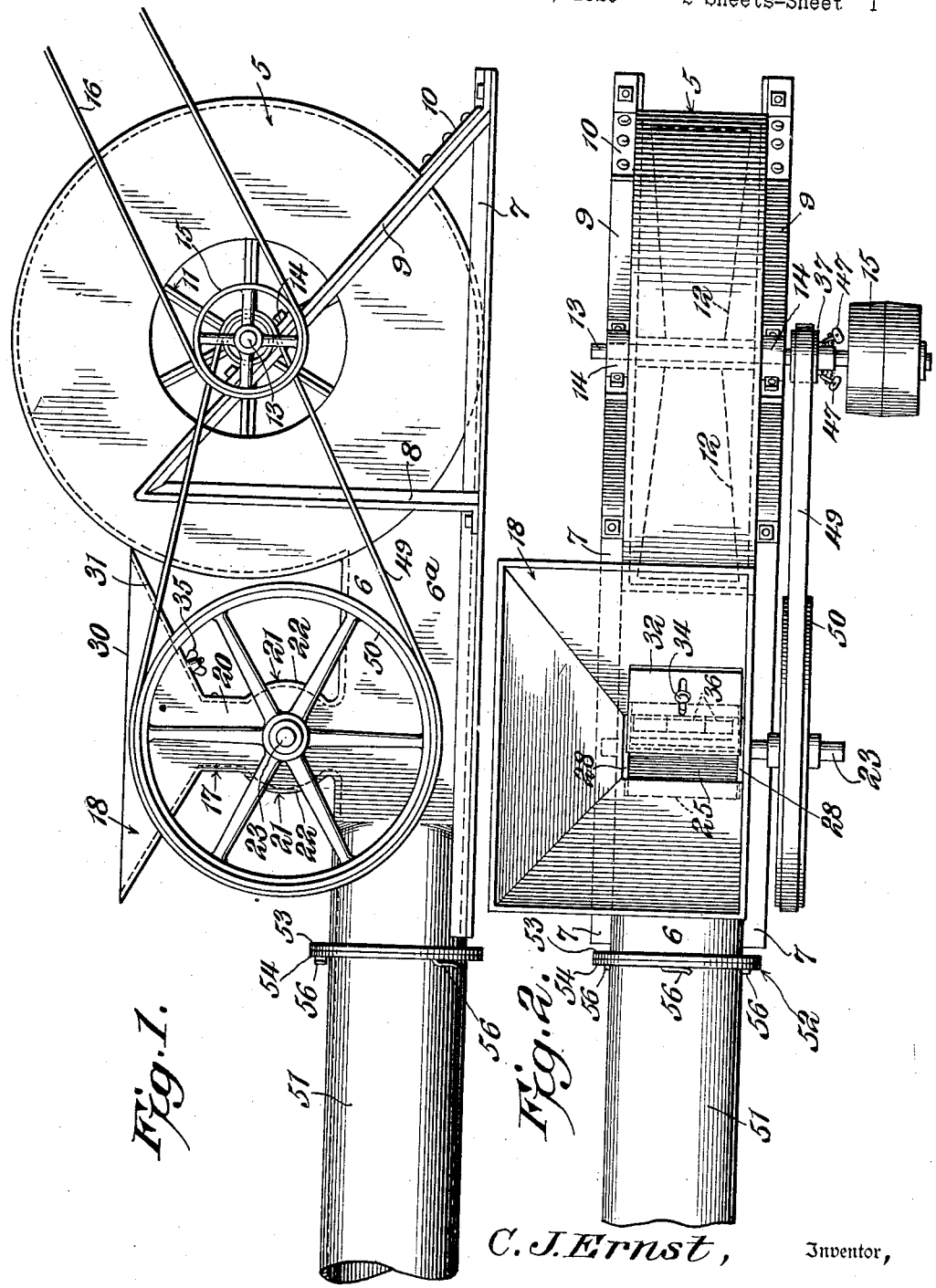
C. J. Ernst, Inventor,
By S. George Tate
Attorney

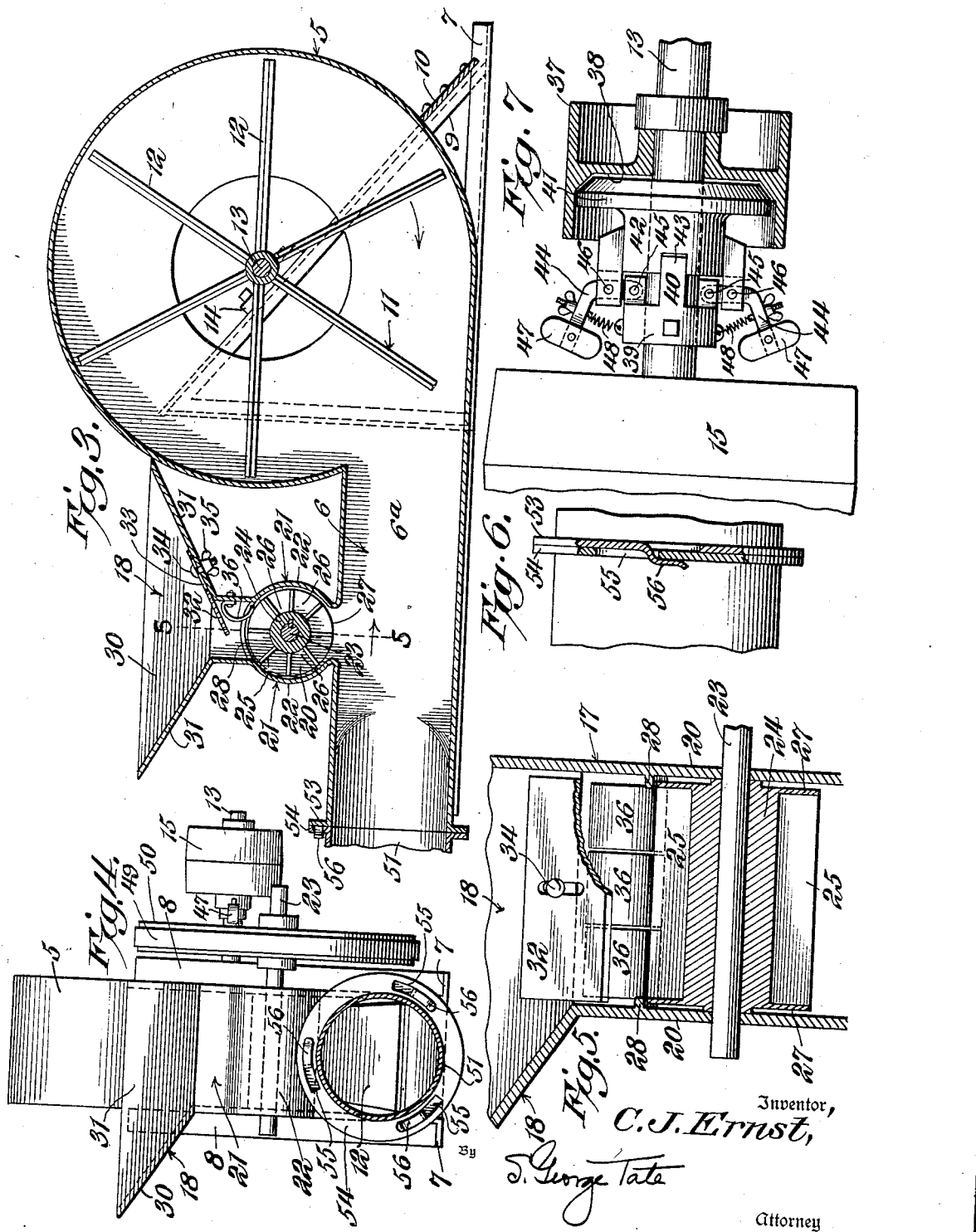

Patented Dec. 22, 1931

1,837,957

UNITED STATES PATENT OFFICE

CLEMENS JOSEPH ERNST, OF FORT LORAMIE, OHIO

AUTOMATIC FEED WHEEL BLOWER

Application filed March 9, 1929. Serial No. 345,793.

This invention relates to new and useful improvements in automatic feed wheel blowers for pneumatic grain elevators for delivering grain and the like into bins.

Among the several objects of my invention are to provide a supporting frame structure for the blower which is extremely simple in construction, durable in operation and cheap to manufacture; to provide a rotary feed wheel of a construction which will avoid injuring the grain and which is positive in action; to provide a governor for automatically connecting the fan and wheel at a predetermined high speed and for automatically disconnecting the wheel from the fan when the speed of the latter falls below a predetermined speed and thereby avoid clogging of the discharge throat by the grain which is deposited therein by the wheel; to provide a rotary feed wheel in a feed throat located between a hopper and the discharge throat and to construct the wheel and the feed throat in a manner to prevent the grain or dirt from entering the bearings of the wheel, and to provide a plurality of spring wipers mounted in the feed throat for cooperation with the feed wheel to smooth down the grain before it enters the feed wheel housing and thereby serve as an anti-clogging means.

With these and other objects in view which will more fully appear, the nature of the invention will be more clearly understood by following the description, the appended claims, and the several views illustrated in the accompanying drawings.

In the drawings:

Figure 1 is a side elevation of my invention,

Figure 2 is a top plan view thereof,

Figure 3 is a vertical longitudinal sectional view thereof,

Figure 4 is an end elevation thereof,

Figure 5 is an enlarged sectional view taken on the line 5—5 of Figure 3,

Figure 6 is an enlarged elevation of my improved pipe coupling, parts thereof being shown in section, and Figure 7 is an enlarged view showing the governor.

Like reference numerals designate corresponding parts throughout the several figures of the drawings.

My invention includes a fan casing 5 having a tangential discharge pipe or throat 6 extending therefrom which is supported on parallel angle bars 7, 7 of a supporting frame structure. Connected to each bar 7 is an upright 8 and an inclined bar 9 is connected at its upper end to the upper end of the upright and at its lower end to the bar 7. A cross-brace 10 is connected at its ends to the lower ends of the inclined bars 9, 9. A rotary fan 11 having blades 12 is provided with a shaft 13 which is journaled at its ends in bearings 14, 14 mounted on the inclined bars 9, 9. A driven pulley 15 is fixed to the shaft 13 and is driven by a belt 16 from any suitable source of power. The fan 11 is rotated in a direction to discharge air outwardly through the discharge throat or pipe 6.

Supported on the discharge throat 6 through the medium of a feed throat 17 is a feed hopper 18, the feed throat being in communication with the discharge throat 6 and with the hopper 18.

The feed throat 17 includes spaced side walls 20, 20 which extend upwardly from and are preferably integral with the side walls 6a, 6a of the discharge pipe 6, and end walls 21, 21. The lower portions 22, 22 of the end walls are curved outwardly in arcs concentric to a shaft 23 which is journaled in the side walls 20, 20. Keyed to the shaft 23 is a hub or core 24 of a feed wheel and fixed to the hub is a plurality of radially extending blades 25, the hub being of a sufficient diameter to form resultant curved surfaces 26 between adjacent blades. The hub 24 and blades 25 extend substantially the entire width between the side walls 20, 20, and are united at their respective ends by circular side walls or discs 27, 27, thereby forming the feed wheel with a plurality of pockets which are closed except at their outer ends and which form dead air spaces. In order to prevent the grain or foreign matter from working down between the discs 27 and the side walls 20 of the casing to the bearings of the shaft 23, I have provided ribs 28, 28 which are secured to the side walls 20 directly above said discs, the ribs being curved to conform to the periphery of the feed wheel. The blades 25 are sufficiently deep to just clear the curved portions 22 of the end walls 21 of the casing, and thereby prevent the grain from being injured during the rotation of the feed wheel.

The hopper 18 includes side walls 29 and 30, and end walls 31, 31 which merge with the side walls 20, 20 and the end walls 21, 21 of the feed throat 17. The side wall 29 lies in the same vertical plane which contains one of the side walls 20, whereas the side wall 30 extends upwardly and outwardly from the feed throat. The end walls 31, 31 extend upwardly and outwardly from the feed throat.

Adjustably mounted on one of the end walls 31 is a plate valve 32, the adjustment being effected by means of a slot 33 formed in the valve and a cooperating clamp bolt 34 and nut 35. One end of the valve extends into the feed throat 17 and functions to regulate the discharge of the grain from the hopper 18 into the feed wheel.

In order to prevent the grain from passing between outer ends of the blades 25 and the curved portions 22 of the feed throat, I have provided a plurality of wipers 36. These wipers are formed of spring metal and arranged in a horizontal series between the feed wheel and the valve. These wipers are attached to the adjacent end wall 21, and have their free ends curved outwardly and thence downwardly and backwardly to project in the direction of rotation of the feed wheel, the extreme free end lying close to but spaced from the blades 25 of the feed wheel. By providing a plurality of these spring wipers any one may operate to smooth down the grain in the wheel without causing the others to be lifted, thus insuring accurate smoothing of the grain in the wheel as well as functioning to avoid the grain being injured.

In order to rotate the feed wheel in the same direction as the fan 11, I have provided a relatively small pulley 37 which is loosely journaled on the fan shaft 13. This pulley includes a clutch face 38. Fixed to the shaft 13 on the same side as the clutch face 38 is a collar 39 having a guide arm 40 extending longitudinally therefrom. Cooperating with the clutch face 38 is a movable clutch 41 which is mounted on the shaft 13 for slidable movements relative thereto. This clutch 41 includes a hub 42 having a longitudinally extending recess 43 for receiving the guide arm 40 so as to insure rotation of the clutch 41 with the shaft 13, yet permitting longitudinal movement of the clutch relative to the shaft. In order to automatically move the clutch 41 into engagement with the clutch 38 upon the shaft 13 attaining a predetermined speed, I have provided a governor which includes radial arms 44, 44 which are each pivoted at one end as at 45 to the collar 39. Each arm 44 is pivoted intermediate its ends as at 46 to the hub 42. The outer end of each arm 44 is provided with a weight 47, and a coil spring 48 is connected at one end to the arm 44 and at its other end to the collar 39. The springs 48 function to hold the weighted arms 44 against outward movement and consequently hold the clutch 41 out of engagement with the clutch face 38. A belt 49 is trained over the pulley 37 and over a relatively large pulley 50 which is fixed to the feed wheel shaft 23.

In operation, the feed wheel shaft will not be rotated until the fan shaft attains a speed sufficient to connect the clutch 41 with the clutch face 38 through the centrifugal action of the weighted arms 44 of the governor. As soon as the speed of rotation of the fan reaches a certain point, the clutch will be connected and the feed wheel will be rotated. Consequently, the feed wheel will not discharge the grain into the discharge throat 6 until the fan reaches a predetermined speed of rotation which is sufficient to force the grain outwardly from the discharge throat 6. Furthermore as soon as the speed of the fan is decreased to a certain point, the governor will automatically disengage the clutch 41 from the clutch face 38 and thereby stop further rotation of the feed wheel. In this manner the feed wheel will discharge grain into the feed throat 6 only when the fan is rotating at a speed sufficient to force said deposited grain out of said feed throat and consequently the danger of the grain clogging the feed throat is eliminated.

A discharge pipe 51 is connected to the end of the discharge throat 6 through the medium of a detachable coupling 52. This coupling includes peripheral flanges 53 and 54 which are respectively formed on the adjacent ends of the throat 6 and pipe 51. The flange 54 is provided with a plurality of openings 55 and the flange 53 is provided with a plurality of tongues 56 which are stamped out of said flange and are adapted to be projected into the openings 55 whereby upon rotation of the pipe 51 the tongues 56 will be interlocked with the flange 54.

It is of course to be understood that the details of structure and arrangements of parts may be variously changed and modified without departing from the spirit and scope of my invention.

I claim:

1. In an automatic feed wheel blower, the combination with a feed hopper including a depending throat and a bottom inclined downwardly to said throat, a slide valve adjustably supported on said inclined bottom and adapted to variably project over said throat, a fan casing having a discharge pipe extending under and having communication with said throat, a rotary feed wheel journaled in said throat and disposed below and in spaced relation to said slide valve, said wheel including a plurality of radially extending feed blades, a plurality of flat springs disposed within the throat between the feed wheel and the valve, said springs being arranged in a horizontal series with their free ends projecting in the direction of rotation of said feed wheel and slightly spaced from the outer ends of the blades.

2. The combination with a hopper including spaced side walls, one wall being vertically disposed and the other being downwardly and inwardly inclined, and spaced end walls extending inwardly and downwardly, said side and end walls merging into a vertically disposed throat, a slide valve adjustably supported on one of the inclined end walls and adapted to variably project over said throat, a fan casing having a discharge pipe extending under and having communication with said throat, a rotary feed wheel journaled in said throat, a fan journaled in said casing, means to rotate said fan, said wheel and fan being rotatable about parallel axes, and driving connections between the fan and the wheel and arranged adjacent the vertical side wall of the hopper.

3. In an automatic feed wheel blower, the combination with a feed hopper including a depending throat, a fan casing having a discharge pipe extending under and having communication with said throat, a rotary feed wheel journaled in said throat, said wheel including a plurality of radially extending feed blades, and a plurality of flat springs disposed within the throat between the feed wheel and the valve, said springs being arranged in a horizontal series with their free ends projecting in the direction of rotation of said feed wheel and slightly spaced from the outer ends of the blades.

4. The combination with a hopper including spaced side walls, one wall being vertically disposed and the other being downwardly and inwardly inclined, and spaced end walls extending inwardly and downwardly, said side and end walls merging into a vertically disposed throat, a fan casing having a discharge pipe extending under and having communication with said throat, a fan journaled in said casing, means to rotate said fan, said wheel and fan being rotatable about parallel axes, and direct driving connections between the fan and wheel including a small pulley rotatable with the fan and a large pulley directly connected with the feed wheel and disposed adjacent the vertical side wall of the hopper.

5. In apparatus of the character described, the combination of a rotary feed wheel, and a spring finger rigidly supported at one end and having its free end extended in the direction of rotation of the wheel and to a point close to but free of engagement with the periphery of said wheel for the purpose described.

In testimony whereof I hereunto affix my signature.

CLEMENS JOSEPH ERNST.